Jan. 30, 1940.   F. H. LE JEUNE   2,188,477
METHOD OF FORMING VEHICLE WHEELS
Filed Feb. 23, 1937   5 Sheets-Sheet 1

INVENTOR.
Frank H. LeJeune
BY Whittemore Hulbert & Belknap
ATTORNEYS

Jan. 30, 1940.　　　　　F. H. LE JEUNE　　　　　2,188,477
METHOD OF FORMING VEHICLE WHEELS
Filed Feb. 23, 1937　　　　5 Sheets-Sheet 4

INVENTOR.
Frank H. LeJeune
BY
ATTORNEYS

Jan. 30, 1940.   F. H. LE JEUNE   2,188,477
METHOD OF FORMING VEHICLE WHEELS
Filed Feb. 23, 1937   5 Sheets-Sheet 5

INVENTOR.
Frank H. LeJeune
BY
Whittemore Hulbert Belknap,
ATTORNEYS.

Patented Jan. 30, 1940

2,188,477

UNITED STATES PATENT OFFICE 2,188,477

METHOD OF FORMING VEHICLE WHEELS

Frank H. Le Jeune, Detroit, Mich., assignor to Kelsey-Hayes Wheel Company, Detroit, Mich., a corporation of Delaware Application February 23, 1937, Serial No. 127,278

17 Claims. (Cl. 29—159.01)

This invention relates to vehicle wheels of the type in which the wheel body portion between the hub and rim is formed of pressed sheet metal fashioned to more or less simulate spokes. More particularly, the invention relates to wheel bodies of the type in which the central portion is fashioned for bolting-on to the hub and is surrounded by an annular portion which in radial section extends axially outwardly from the bolting-on portion and then extends inwardly in a general radial direction. The periphery of the latter portion of the wheel body terminates in a cylindrical rim engaging flange and a portion of the metal between this flange and the bolting-on portion may be fashioned to form a series of radial spoke-like sections with apertures intermediate the same.

It is one of the principal objects of this invention to simplify, render more efficient, and improve generally the manufacture of wheel bodies of the general type previously set forth by providing a method of forming the wheel body composed of a relatively few simple steps capable of being expediently effected. In accordance with my improved method, a cylinder of appreciable length is subjected to a series of pressing operations to form a wheel body of substantial radial dimension without materially thinning, or overstressing any portion of the material. The manner in which the above is accomplished will be made more apparent as this description proceeds, especially when considered in connection with the accompanying drawings, wherein:

Figure 3:
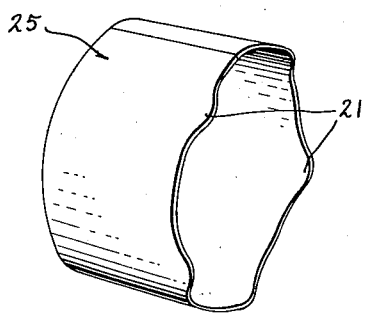
Figure 3 is a perspective view of the cylindrical blank formed from the flat sheet of metal shown in Figure 2.

While it has been proposed in the past to form wheel bodies of the general type illustrated herein from a tubular blank of the type shown in Figure 3, nevertheless, the methods employed in the past are only applicable in cases where the radial dimension of the wheel body is relatively small. In other words, with the prior methods, there is a tendency to overstress and cause wrinkling of the metal unless the tubular blank is relatively short in length. In accordance with the present invention, a wheel body having a greater radial dimension may be formed from a tubular blank without excessive thinning or overstressing of any portion of the metal.

Figure 1:
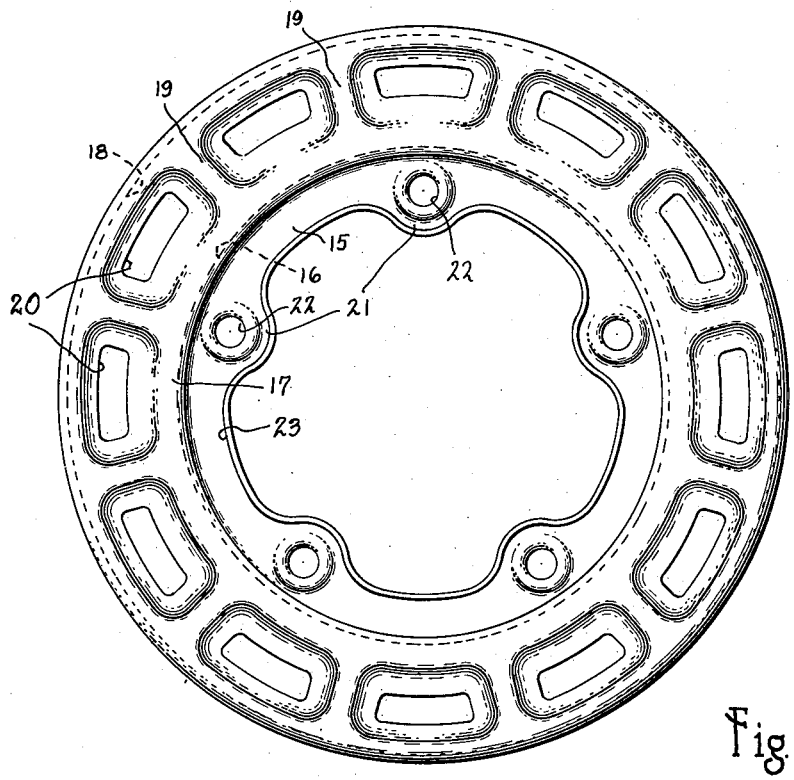
Figure 1 is a plan view of a wheel body fashioned in accordance with my improved method.
Figure 2:
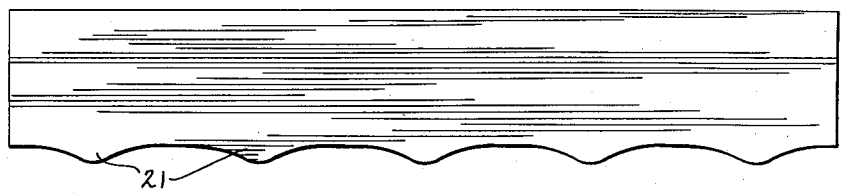
Figure 2 is a development view of the flat sheet metal blank used in forming the tubular or cylindrical blank.
Figure 11:
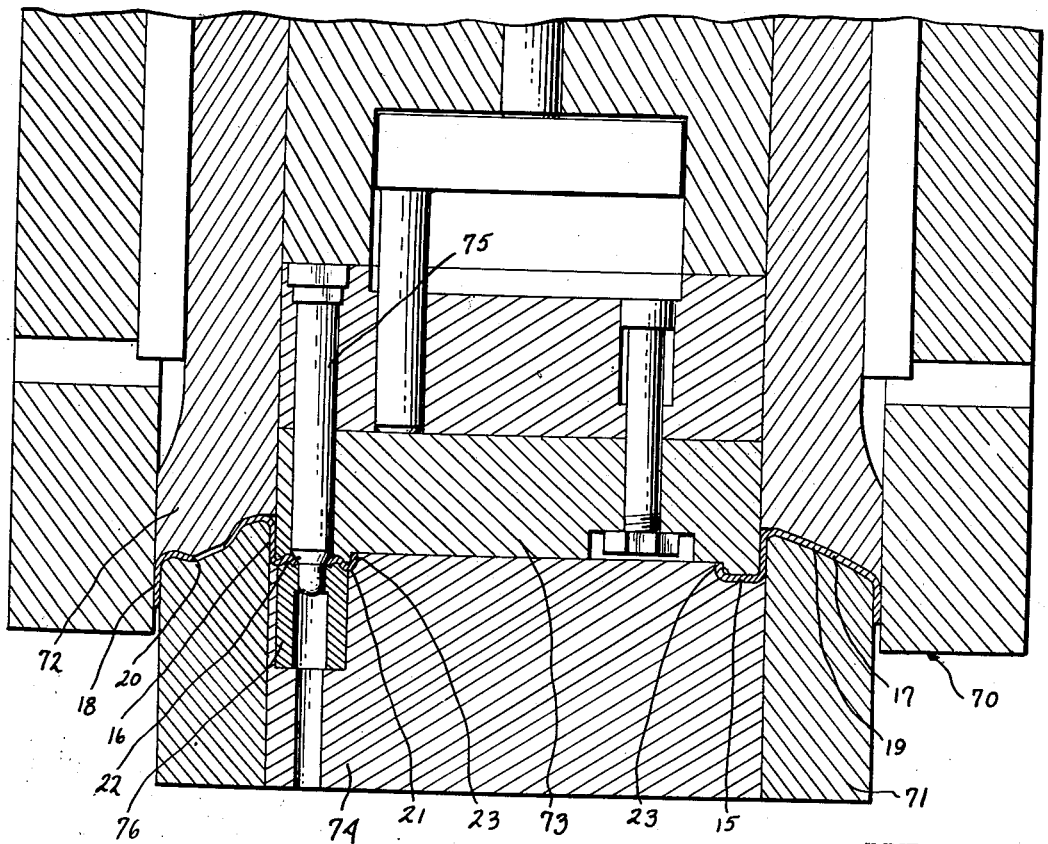

With the above in mind, reference will now be made to the particular construction of wheel body manufactured by the method forming the subject matter of this invention and shown in Figures 1 and 11. In detail, the wheel body is provided with a central radially extending portion 15 having the radially outer portion connected to an axially outwardly extending annular portion 16 which, in turn, has the axially outer portion connected to the axially outer portion of an annular rim engaging flange 18 by a radially inwardly extending portion 17 fashioned to provide spoke simulating portions 19. The spoke portions 19 are fashioned to extend radially and openings 20 are formed in the portion 17 between the spokes. Upon reference to Figure 1, it will be noted that the bolting-on portion 15 of the wheel body is formed with radially inwardly extending scallops 21 spaced equal distances from each other circumferentially of the bolting-on portion and apertured, as at 22, to receive the fastening bolts. As shown best in Figure 11, the inner marginal edge of the bolting-on flange is turned outwardly to provide an axially outwardly extending reinforcing flange 23. It will, of course, be understood that the above construction of wheel body member is shown herein for the purpose of illustration only, and that the present method is not limited to this specific type of construction.

The first step in the method of fashioning the wheel body described above consists in forming a strip of sheet metal to the desired length and in forming the scalloped portions 21 on one longitudinal edge of the strip. The scalloped portions 21 are so spaced from each other that when the wheel body is completed, they assume the positions thereof shown in Figure 1 of the drawings. The flat blank is then coiled in any suitable manner and the adjacent edges are united, preferably by butt-welding the same together, to form a tubular or cylindrical blank 25 having a predetermined diameter designated by the reference character A in Figure 4 of the drawings. The blank thus formed is introduced to suitable apparatus 26 and the scalloped end portion of the blank is contracted or bent inwardly to a limited degree on a continuous curve 27.

Figure 4:
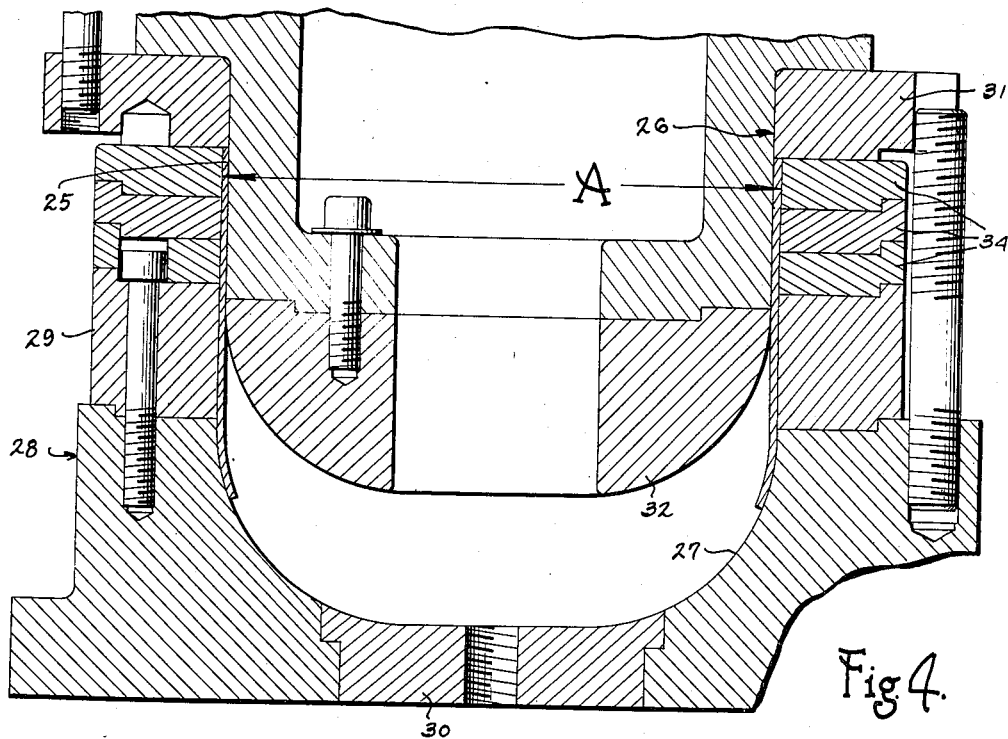
Figures 4 to 11, inclusive, are cross sectional views illustrating the different steps of the method of forming the tubular blank shown in Figure 3 to the contour illustrated in Figure 1.

Upon reference to Figure 4, it will be noted that the apparatus 26 comprises a die 28 having a cylindrical upper end portion 29 of substantial height and having a central section 30 provided with a top surface connected to the internal cylindrical surface of the annular portion 29 by means of the continuously curved surface 27. The section 30 may be raised into the die in any suitable manner (not shown) for the purpose of ejecting the blank from the die. The internal cylindrical surface of the die approximates the diameter A of the blank and the latter has a sliding fit within the upper portion of the die so that the side walls of the blank are held from bowing outwardly when the ring 31 exerts the downward pressure on the upper edge of the blank required to initially contract the lower or scalloped end of the blank. In this connection, it will also be noted that the pressure exerted by the ring is prevented from bowing the blank inwardly by means of the punch 32 movable as a unit with the ring 31 and having a sliding fit with the interior surface of the blank. It follows from the above that the cylindrical portion of the blank is not only held from buckling during the interval the scalloped lower end is initially contracted but, in addition, the diameter A of this portion of the blank is preserved.

Figure 5:
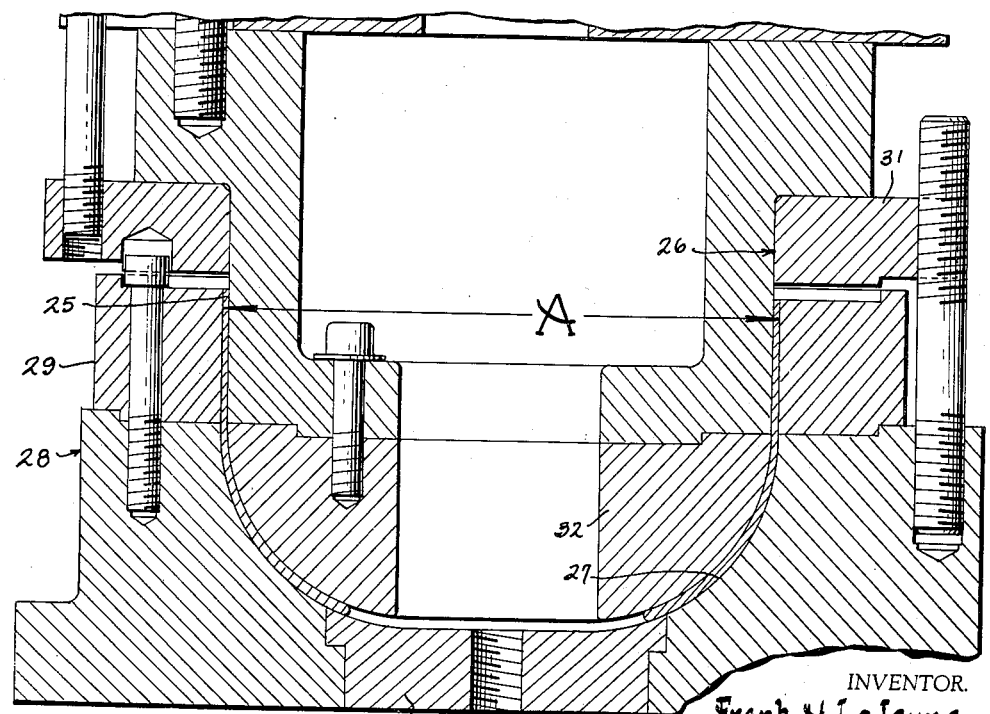

The following step in the method of manufacture consists in upsetting the lower end of the tubular blank by continuing the downward movement of the blank into the die 28 to bend the lower portion of the blank inwardly on the continuous curve 27 in the manner clearly shown in Figure 5. This final bending operation may be effected in the same press 26 employed in Figure 4 to initially start the bowing-in of the scalloped end of the blank. If the same press is used, however, the upper end portion of the die 29 is formed of a plurality of superposed shims 34 and these shims are removed prior to effecting the last named step of the method. It will, of course, be understood that removal of the shims provides for obtaining the increased vertical travel of the pressure ring 31 and punch 32 required to bend the lower end of the tubular blank along the continuously curved surface 27 of the die to the extent shown in Figure 5. It will also be understood that the scalloped portions assist bending the lower end of the blank inwardly on the continuously curved surface 27 of the die and that the upper portion of the tubular blank is maintained to the diameter A during this final bending operation.

In some cases, the steps of the method shown in Figures 4 and 5 may be combined into one operation but, in the present instance where a substantial length of the tubular blank above the die is unsupported at the outer side during the initial bending operation, it is preferable to extend the vertical portion of the die to reduce this length and thereby overcome any tendency for the blank to buckle outwardly. As a matter of fact in the illustrative embodiment of the press, three of the shims 34 are supported in superposed relation on the top surface of the die 29, and these shims may be successively removed as the tubular blank is forced along the curved surface 27 of the die by the pressure ring 31 so that the minimum length of the blank is left unsupported at the outer side thereof. However, such practice would increase the number of steps of the method and is only resorted to when absolutely necessary.

Referring again to Figure 5, it will be noted that after the scalloped, or lower end of the tubular blank, has been cupped the inner marginal edge of the blank overlaps the pad 30 and the construction is such that when the punch 32 is raised, the pad ejects the cupped blank from the die. The blank is then annealed and, after the annealing operation, the scalloped end of the blank is telescoped into the cylindrical portion 35 of the blank to form a return bend 36 having an inner axially extending annular portion 37 of a predetermined diameter designated in Figure 6 by the reference character B. It will also be noted from the above figure that the axially outer portion of the axially extending portion 37 terminates in a radially inwardly extending flat flange 38 which corresponds to the bolting-on portion 15 of the wheel body and includes the scallops 21. Upon reference to Figure 6, it will be noted that the return bend is formed by the cooperation of a fixed die assembly 40 with relatively movable die members 41 and 42. Briefly described, the die section 42 of the relatively movable die members is provided with an annular flange 44 having an external diameter predetermined to slidably fit within the upper end of the tubular blank and adapted to cooperate with the fixed die assembly 40 to form the return bend 36 in the blank. The die section 41 is in the form of a ring surrounding the pilot 43 within the annular portion 44 of the die section 42 and is normally yieldably urged in a downward direction by means of the springs 46. During the final movement of the die section 42, the ring 41 is positively engaged by the section 42 so as to cooperate with the die assembly 40 in forming the flat radially extending flange 38 on the blank. In this connection, it is to be noted that inward movement of the lower end of the blank is limited by contact with the pilot 43, and also that the metal upset by bending the lower end of the blank inwardly is thinned to the approximate gauge of the cylindrical side walls of the blank by the stretching resulting from forming the return bend in the blank. It may also be pointed out that the inner cylindrical surface 47 of the fixed die section 48 has a diameter equal to the diameter A of the tubular upper end portion of the blank so that this diameter is maintained during the telescoping operation.

Figure 6:
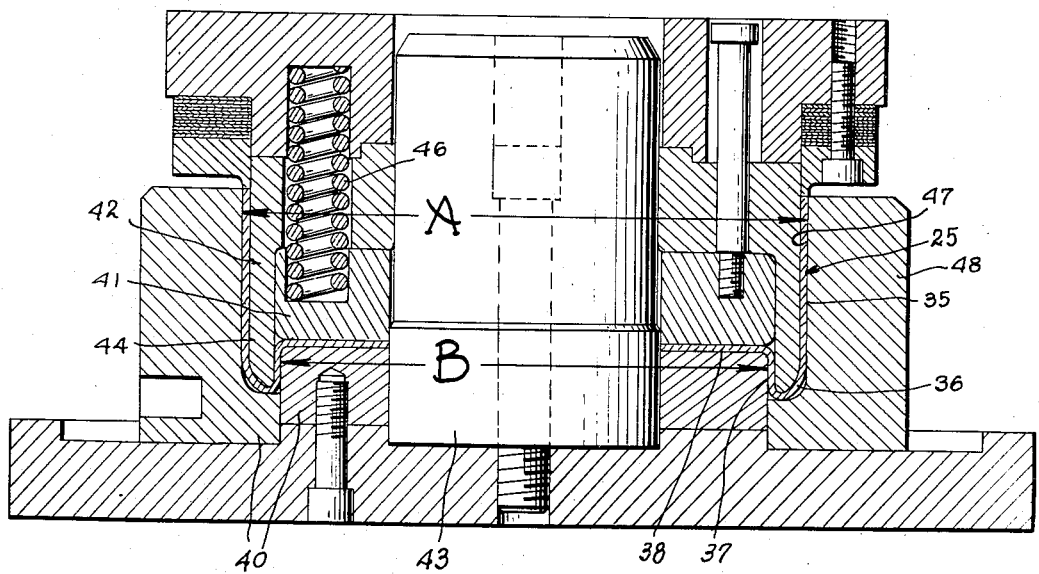
Figure 7:
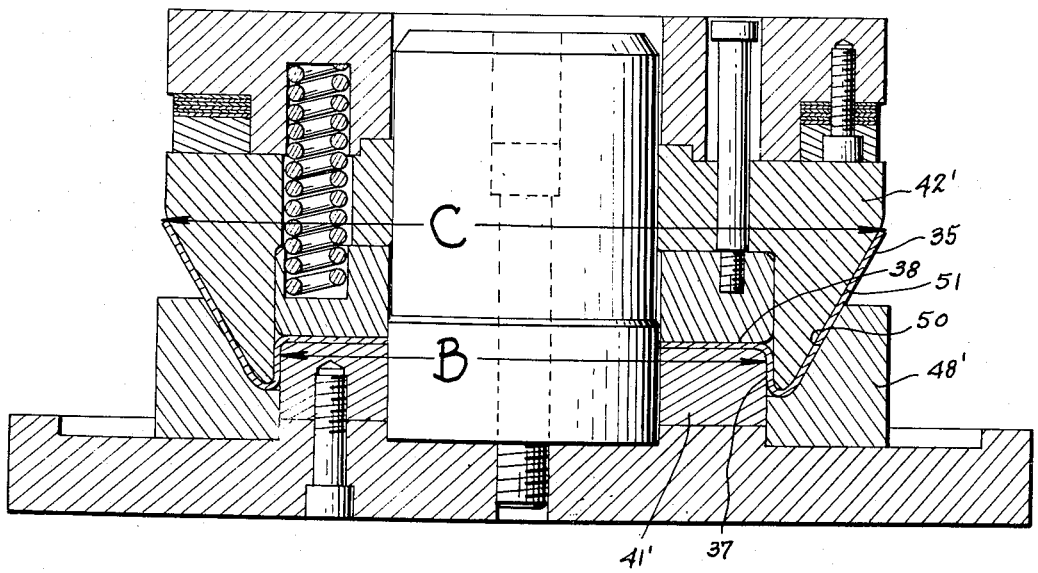

The next step in the method consists in increasing the diameter A to the diameter C shown in Figure 7 by flaring the cylindrical portion 35 of the blank shown in Figure 6 outwardly. This operation is effected without changing the diameter B of the inner axially extending annular portion 37 of the blank and without disturbing the flat radially inwardly extending flange 38. Upon reference to Figure 7, it will be noted that the cooperating dies for flaring the cylindrical portion 35 of the blank outwardly differ from the die construction illustrated in Figure 6 in that the inner surface 50 of the fixed die section 48' is flared outwardly at the desired angle instead of being cylindrical. In addition, the exterior surface 51 of the movable die section 42' is correspondingly flared outwardly to cooperate with the surface 50 in displacing the cylindrical portion 35 of the blank outwardly to the extent necessary to secure the diameter C at the periphery thereof. It follows from the above that the internal diameter B is maintained during the flaring operation and that the flat radially inwardly extending flange 38 is preserved by the movable die section 41', which is similar to the corresponding die section 41 in the apparatus illustrated in Figure 6.

Figure 8:
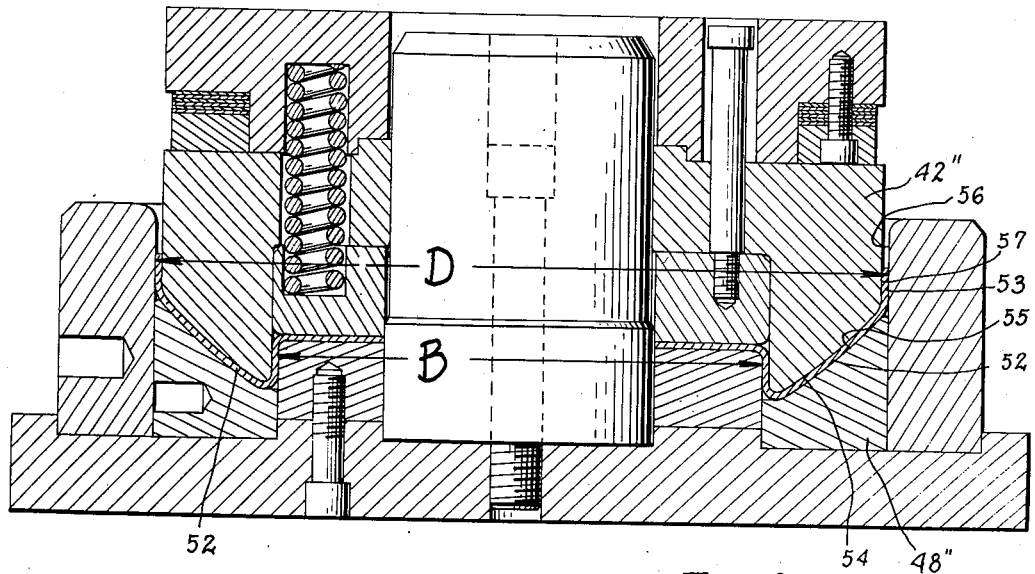

The following step in the method of manufacture consists in expanding the flared portion of the blank shown in Figure 7 to form a slightly curved intermediate section 52 terminating in a cylindrical portion 53 having a predetermined diameter D greater than the diameter C of the blank shown in Figure 7. The resulting blank is shown in Figure 8 and, as will be observed from this figure, the diameter B of the inner axially extending portion is maintained during this operation. This will be apparent when considering that the cooperating dies for performing this step in the method are identical to the one shown in Figure 7, with the exception that the exterior surface 54 of the downwardly movable die section 42" is curved on the desired radius and the cooperating surface 55 of the fixed die section 48" is correspondingly curved. Also, the die surface 55 terminates in an upwardly extending cylindrical surface 56 which cooperates with the exterior cylindrical surface 57 on the die section 42" to form the cylindrical or axially extending portion 53 on the blank. With the above exceptions, the cooperating dies are the same as those shown in both of Figures 6 and 7, with the result that the diameter B is retained during this step of the method.

Figure 9:
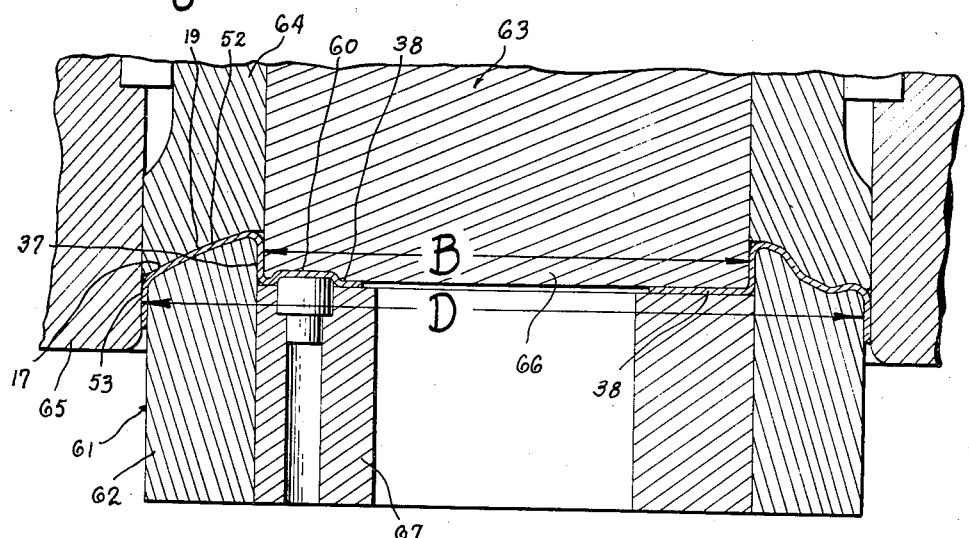

Upon reference to Figure 9, it will be noted that the next step in the method consists in reducing the axial overall width of the blank to the desired dimension, by forming the outwardly projecting portion 52 thereof to increase the length of the axially extending peripheral portion 53 and to fashion the spoke portions 19. During this forming operation, the diameter D of the peripheral flange 53 noted in Figure 8 is maintained, and the diameter B of the axially extending portion 37 is likewise maintained. At the time the foregoing operations are effected, the radially inwardly extending flange 38 of the blank is embossed in an outward direction at each of the scalloped portions to form circular raised portions 60 through which the openings 22 are subsequently formed.

The foregoing operations are performed in the apparatus 61 having a fixed annular die 62 and having a punch 63 supported for movement toward and away from the annular die 62. The internal diameter of the annular die 62 is such as to slidably receive the inner axially extending portion 37 of the blank and the exterior diameter of the die is predetermined to slidably engage the inner cylindrical surface of the annular peripheral flange 53 of the blank. Movable with the punch is an annular die ring 64 having a bottom surface fashioned to cooperate with the preformed top surface of the die 62 to form the spoke portions 19 and to shape the radially outwardly extending portion 52 of the blank, shown in Figure 8, to the finished contour of the portion 17 of the wheel body shown in Figures 1 to 11. In addition, the punch 63 operates an annular ring 65 surrounding the die member 64 and cooperating with the exterior annular surface of the die member 62 to lengthen the peripheral flange 53 to the dimension of the rim engaging portion 18 of the finished wheel body. Inasmuch as the external diameter of the annular die member 62 is predetermined to have a sliding fit with the inner cylindrical surface of the peripheral flange 53, it follows that the diameter D is maintained as the length of this flange is increased.

It will also be noted that the punch 63 has a portion 66 adapted to telescope within the axially extending portion 37 of the wheel body and to cooperate with a plate 67 to not only emboss the radially inwardly extending flange 38 of the blank, but to also maintain the latter in a radial plane during the spoke forming operation. It may also be pointed out that the portion 66 of the punch 63 cooperates with the inner cylindrical surface of the die member 62 to maintain the axially inwardly extending portion 37 of the blank to the diameter B, as the foregoing operations are performed on the blank.

Figure 10:
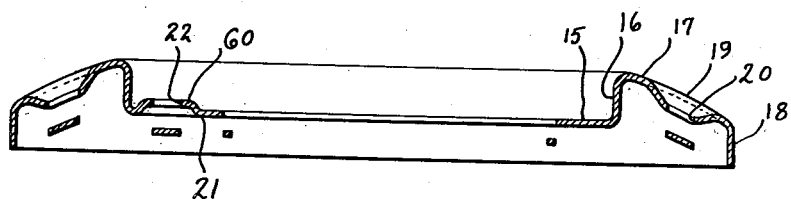

The following operation, shown in Figure 10, consists in trimming the central opening of the blank to size and in piercing both the embossed portions 60 and the radially outwardly extending portion 17 of the wheel body to form openings through these portions. These three operations are preferably performed simultaneously and may be effected by any suitable fixture.

In the final forming operation, the bolt holes are not only swaged and re-struck, but the marginal edge portion of the central opening is bent axially outwardly to provide the reinforcing flange 23. These operations are effected in a fixture 70 having relatively movable die members 71 and 72 identical in construction to the die members 62 and 64, shown in Figure 9. The fixture 70 differs, however, from the showing in Figure 9 in that the punch 73 and plate 74 carry cooperating parts 75 and 76 for re-striking and swaging the bolt openings. It will be noted from the above that the fixture 70 is designed to maintain the wheel body to its desired shape during the restriking and swaging of the bolt holes.

Thus, from the foregoing, it will be observed that I have provided a relatively simple and inexpensive method of manufacturing wheel bodies from cylindrical blanks. It will also be noted that with my improved method, cylindrical blanks of substantial length may be fashioned to form wheel bodies having a relatively large radial dimension without overstressing or materially thinning out any portion of the metal. Attention may also be called to the fact that while all of the various steps of the method cooperate to accomplish the above result, nevertheless, the step of scalloping one end of the cylindrical blank prior to the forming operations is largely responsible for the successive operation of the method, since these scallops appreciably assist in upsetting or bending the blank inwardly to the extent required to form the wheel body. In addition, it will be observed from Figure 10 that the wheel body resulting from the various steps of the method previously described is tapered from the inner edge of the bolting-on flange to the free edge of the rim engaging flange. The central portion is thicker than the outer portions and this is desirable in that it provides for concentrating the maximum strength in the region where the stresses are the greatest.

What I claim as my invention is:

1. Those steps in the method of forming wheel bodies which consist in forming a tubular sheet metal blank with scalloped portions at one end, upsetting said end of the blank by bending the latter end portion inwardly and telescoping said end portion within the tubular blank to form a return bend.

2. Those steps in the method of forming wheel bodies having a radially extending bolting-on flange provided with circumferentially spaced radially inwardly extending scalloped portions apertured to receive bolts, which consist in forming a tubular blank with the scalloped portions aforesaid at one end, bending the latter end portion of the tubular blank inwardly, telescoping the scalloped portion within the blank, and simultaneously fashioning the portion intermediate the scalloped end portion and tubular side walls of the blank into a return bend.

3. Those steps in the method of forming wheel bodies having a radially extending bolting-on flange provided with circumferentially spaced radially inwardly extending scalloped portions apertured to receive bolts, which consist in forming a tubular blank with the scalloped portions aforesaid at one end, bending the latter end portion of the tubular blank inwardly, telescoping the scalloped portion within the blank, and simultaneously flattening the scalloped portion in a radial plane.

4. Those steps in the method of forming wheel bodies which consist in bending one end of a tubular blank inwardly to reduce the diameter of the opening at said end, telescoping the inwardly bent portion into the tubular blank to form an annular wall spaced radially inwardly from the side walls of the blank, and holding the said side walls of the blank to the original diameter of the blank during the telescoping operation.

5. Those steps in the method of forming wheel bodies which consist in forming a tubular sheet metal blank with scalloped portions at one end, bending said end inwardly, telescoping the inwardly extending portion into the blank to form a return bend, simultaneously flattening the scalloped portions in a radial plane, and holding the annular side walls of the blank to the original diameter during the telescoping operation.

6. Those steps in the method of forming wheel bodies which consist in forming a tubular sheet metal blank of predetermined diameter, bending one end portion of the blank inwardly while holding the remaining portions of the blank to said diameter, telescoping the inwardly bent end into the blank to form a return bend with an inner annular axially extending portion of predetermined diameter spaced from the annular side wall of the blank and with a radially inwardly extending flange at the free edge of the axially extending inner portion, and holding the outer side wall portions of the blank to the predetermined diameter of the blank during the telescoping operation.

7. Those steps in the method of forming wheel bodies which consist in bending one end portion of a tubular sheet metal blank inwardly, telescoping the inwardly extending portion into the blank to form a return bend, fashioning the return bent portion with an inner axially extending annular portion of predetermined diameter and with a flat radially inwardly extending flange at the free edge of the axially extending portion, and flaring the wall of the blank outwardly while maintaining the predetermined diameter aforesaid of the axially extending portion.

8. Those steps in the method of forming wheel bodies which consist in bending one end portion of a tubular sheet metal blank inwardly, telescoping the inwardly extending portion into the blank to form a return bend, fashioning the return bent portion with an inner axially extending annular portion of predetermined diameter and with a flat radially inwardly extending flange at the free edge of the axially extending portion, flaring the wall of the blank outwardly while maintaining the predetermined diameter aforesaid of the axially extending portion, and bending the free edge portion of the flared wall inwardly to provide an axial portion of predetermined diameter.

9. Those steps in the method of forming wheel bodies which consist in bending one end portion of a tubular sheet metal blank inwardly, telescoping the inwardly extending portion into the blank to form a return bend, simultaneously fashioning the return bent portion with an inner axially extending annular portion of predetermined diameter and with a flat radially inwardly extending flange at the free edge of the axially extending portion, flaring the wall of the blank outwardly while maintaining the predetermined diameter aforesaid of the axially extending portion, bending the free edge portion of the flared wall inwardly to provide an axial portion of predetermined diameter, and shaping the portion of the wall between the axially extending portions aforesaid to form spoke simulating portions.

10. Those steps in the method of forming wheel bodies which consist in bending one end portion of a tubular sheet metal blank inwardly, telescoping the inwardly extending portion into the blank to form a return bend, fashioning the return bent portion with an inner axially extending annular portion of predetermined diameter and with a flat radially inwardly extending flange at the free edge of the axially extending portion, flaring the wall of the blank outwardly while maintaining the predetermined diameter aforesaid of the axially extending portion, bending the free edge portion of the flared wall inwardly to provide an axial portion of predetermined diameter, shaping the portion of the wall between the axially extending portions aforesaid to form spoke simulating portions, and simultaneously holding the axially extending portion at the radially outer edge of the wall to the predetermined diameter aforesaid.

11. Those steps in the method of forming wheel bodies which consist in bending one end portion of a tubular sheet metal blank inwardly, telescoping the inwardly extending portion into the blank to form a return bend, fashioning the return bent portion with an inner axially extending annular portion of predetermined diameter and with a flat radially inwardly extending flange at the free edge of the axially extending portion, flaring the wall of the blank outwardly while maintaining the predetermined diameter aforesaid of the axially extending portion, bending the free edge portion of the flared wall inwardly to provide an axial portion of predetermined diameter, fashioning the portion of the wall between the axially extending portions aforesaid to a selected contour, and simultaneously holding both the axially extending portions to their respective predetermined diameters.

12. Those steps in the method of forming wheel bodies which consist in bending one end portion of a tubular sheet metal blank inwardly, telescoping the inwardly extending portion into the blank to form a return bend, fashioning the return bent portion with an inner axially extending annular portion of predetermined diameter and with a flat radially inwardly extending flange at the free edge of the axially extending portion, flaring the outer wall of the blank outwardly to provide a predetermined diameter at the free edge thereof, holding said axially extending inner portion to the aforesaid predetermined diameter thereof during the flaring operation and fashioning the flared portion to form a cylindrical portion on the free end thereof at the diameter of said latter end.

13. Those steps in the method of forming wheel bodies which consist in forming a tubular sheet metal blank of predetermined diameter with scalloped portions at one end, bending said end portion inwardly while maintaining the remainder of the blank at said predetermined diameter, telescoping the inwardly bent end into the blank to form a return bent, fashioning the return bent portion with an inner axially extending portion of predetermined diameter and with the scalloped portions extending radially inwardly from the free edge of the axially extending portion, flaring the outer cylindrical wall outwardly to provide a predetermined diameter at the periphery thereof, fashioning the flared portion to form an axially extending portion at the free edge thereof on the diameter aforesaid of said edge, and holding the inner axially extending portion to the said predetermined diameter thereof during both the fashioning and flaring operations.

14. Those steps in the method of forming wheel bodies which consist in forming a tubular sheet metal blank with scalloped portions at one end, bending said end inwardly, telescoping the inwardly extending portion into the blank to form a return bend, flattening the scalloped portions in a radial plane, embossing each of the scalloped portions, and forming bolt receiving openings in the embossed portions.

15. Those steps in the method of forming wheel bodies which consist in forming a tubular sheet metal blank with scalloped portions at one end, bending said end inwardly, telescoping the inwardly extending portion into the blank to form a return bend, simultaneously flattening the scalloped portions in a radial plane, embossing each of the scalloped portions, forming bolt receiving openings in the embossed portions, and bending the inner marginal edge of the radially inwardly extending scalloped portions to form an axially extending portion.

16. Those steps in the method of forming wheel bodies which consist in bending one end portion of a tubular sheet metal blank inwardly, telescoping the inwardly extending portion into the blank to form a return bend, fashioning the return bent portion with a radially inwardly extending portion of predetermined diameter and with a radially inwardly extending flange at the free edge of the axially extending portion, and shaping the outer wall portion of the blank to form spoke portions while maintaining the predetermined diameter aforesaid of the axially extending portion.

17. Those steps in the method of forming wheel bodies which consist in upsetting and thereby thickening one end of a tubular sheet metal blank to provide said end with an inwardly extending portion, telescoping the inwardly extending portion within the tubular blank to form a return-bend with radially spaced substantially parallel inner and outward walls, and forming the free edge portion of said end of the blank to provide a radially inwardly extending flange.

FRANK H. LE JEUNE.